(12) United States Patent
Rimar et al.

(10) Patent No.: US 11,374,826 B2
(45) Date of Patent: Jun. 28, 2022

(54) SYSTEMS AND METHODS FOR ENHANCED MONITORING OF A DISTRIBUTED COMPUTING SYSTEM

(71) Applicant: ServiceNow, Inc., Santa Clara, CA (US)

(72) Inventors: Yuval Rimar, Petah Tikva (IL); Haviv Rosh, Modiin (IL); Tal Kapon, Givataim (IL); Netta Hasdai, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 153 days.

(21) Appl. No.: 16/923,054

(22) Filed: Jul. 7, 2020

(65) Prior Publication Data
US 2020/0336392 A1    Oct. 22, 2020

Related U.S. Application Data

(63) Continuation of application No. 16/201,680, filed on Nov. 27, 2018, now Pat. No. 10,715,402.

(51) Int. Cl.
| | |
|---|---|
| *H04L 12/24* | (2006.01) |
| *H04L 41/22* | (2022.01) |
| *G06F 16/9532* | (2019.01) |
| *H04L 41/046* | (2022.01) |
| *H04L 41/0873* | (2022.01) |

(52) U.S. Cl.
CPC ......... *H04L 41/22* (2013.01); *G06F 16/9532* (2019.01); *H04L 41/046* (2013.01); *H04L 41/0873* (2013.01)

(58) Field of Classification Search
CPC ........ H04L 41/22; H04L 41/12; H04L 41/046
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |

(Continued)

*Primary Examiner* — Arvin Eskandarnia
(74) *Attorney, Agent, or Firm* — Fletcher Yoder PC

(57) ABSTRACT

The present approach relates to querying a configuration item (CI). The CI may be associated with a monitoring agent. In accordance with this approach, a check request is sent to a management, instrumentation, and discovery (MID) server. The check request may be sent to the monitoring agent. Additionally, a check result may be received from the monitoring agent. The check result may have data associated with the CI and the check request.

20 Claims, 7 Drawing Sheets

(56) References Cited

U.S. PATENT DOCUMENTS

| | | | |
|---|---|---|---|
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,983 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,116,461 B2 * | 10/2018 | Fairweather .............. G06F 8/76 |
| 2010/0115520 A1 * | 5/2010 | Kohno .................. G06F 9/4843 |
| | | | 718/101 |
| 2016/0050126 A1 * | 2/2016 | Rubio ................. H04L 41/5054 |
| | | | 709/226 |
| 2018/0324132 A1 * | 11/2018 | Barnard ................. H04L 67/02 |

* cited by examiner

SYSTEMS AND METHODS FOR ENHANCED MONITORING OF A DISTRIBUTED COMPUTING SYSTEM

CROSS-REFERENCE TO RELATED APPLICATION(S)

This application is a continuation of U.S. patent application Ser. No. 16/201,680, filed Nov. 27, 2018, which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. Resources may often be removed and added to a network. As such, network management may require a better monitoring solution that supports a dynamic and changing environment of resources.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. With this in mind, an IT system may include service mapping logic that generates an accurate, service-aware view (e.g., a "service mapping") of the system infrastructure that is frequently refreshed, keeping the view up to date. The service mapping may be constructed by automatically discovering and mapping relationships between IT components running specific services. The service mapping logic may monitor the IT infrastructure for service-affecting changes and update the service mapping in real-time. The service mapping may provide a mix of applications and IT components that support a service and provide an understanding of how these applications and components are related.

The disclosed techniques enable a user to better maintain and manage a dynamic network of components. Specifically, the disclosed techniques enable a user to perform checks (e.g., discovery, metrics, or event management) on various configuration items (CIs) (e.g., devices, applications, containers, microservices, or ephemeral entities) on devices employed within a distributed system that may often be subject to change. For example, CIs may frequently be added, updated, or removed from the distributed system infrastructure. The disclosed techniques provide a multipartite paradigm that facilitates communication between a monitoring agent installed on a device associated with one or more CIs, a management or administrative server (e.g., a management, instrumentation, and discovery (MID) server), and a configuration management service to efficiently monitor data associated with each CI in the distributed system. In some embodiments, the multipartite paradigm may include more than one monitoring agent. For example, a monitoring agent may be installed on each device in a network that has multiple devices, and each monitoring agent may communicate with a MID server and a configuration management service. As such, the multipartite paradigm may provide an efficient and scalable monitoring framework that facilitates discovery, event management, and metrics collection with a plurality of CIs in the distributed system. The data shared between the monitoring agent, the MID server, and the configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the configuration management service.

Additionally, the monitoring agent may minimize the need to bind a CI to data produced as a result of a check performed by the monitoring agent on the CI. After installation of the monitoring agent on a device associated with a CI, the monitoring agent may register an occurrence of the monitoring agent with the MID server, which, in turn, may register the occurrence of the monitoring agent with the configuration management service. Thereafter, the monitoring agent may send a CI identifier with any data the monitoring agent has collected from a check associated with the CI to the MID server. The MID server may also transmit the received data with the CI identifier to the configuration management service. As such, the MID server and the configuration management service may automatically determine the CI associated with the received data based on the CI identifier received with the data, thereby minimizing the need for a user to manually bind data to a CI.

After the monitoring agent has registered an occurrence of the monitoring agent with the MID server and the configuration management service, the monitoring agent may perform one or more checks associated with the CI. In some embodiments, the MID server may send a check request to the monitoring agent to perform on the CI. For example, after determining that a received check request corresponds to the performance of a discovery process, the monitoring agent may perform the discovery process associated with the corresponding CI to determine one or more attributes of the CI, such as a name of the CI or a CI identifier, an internet protocol (IP) address associated with the CI, a serial number associated with the CI, a time stamp associated with the check (e.g., discovery process) performed on the CI, or the like, and identify any executing processes on the CI. The monitoring agent may then send a discovery payload (e.g., data collected as a result of the discovery process) to the MID server, which may then store the data in the database. In some embodiments, upon receiving the discovery payload from the monitoring agent, the configuration management service may determine one or more tasks for the monitoring agent to perform based on the received information. For example, the configuration management service may send a command to the monitoring agent to collect metrics associated with the CI, collect event information associated with the CI, perform one or more discovery processes, or the like.

A user may also run a query on one or more devices and/or one or more CIs in the distributed system via the configuration management service. For example, the configuration management service may generate a check request based on the query generated by the user. The configuration management service may then send the check request to a relevant MID server, which may then send the check request to the appropriate monitoring agent. After receiving the check request from the MID server, the monitoring agent may then execute the corresponding check associated with the check request and send the results back to the configuration management service via the MID server. As such, the user may receive query results associated with a device and/or a CI of the distributed system in real-time (or substantially in real-time).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
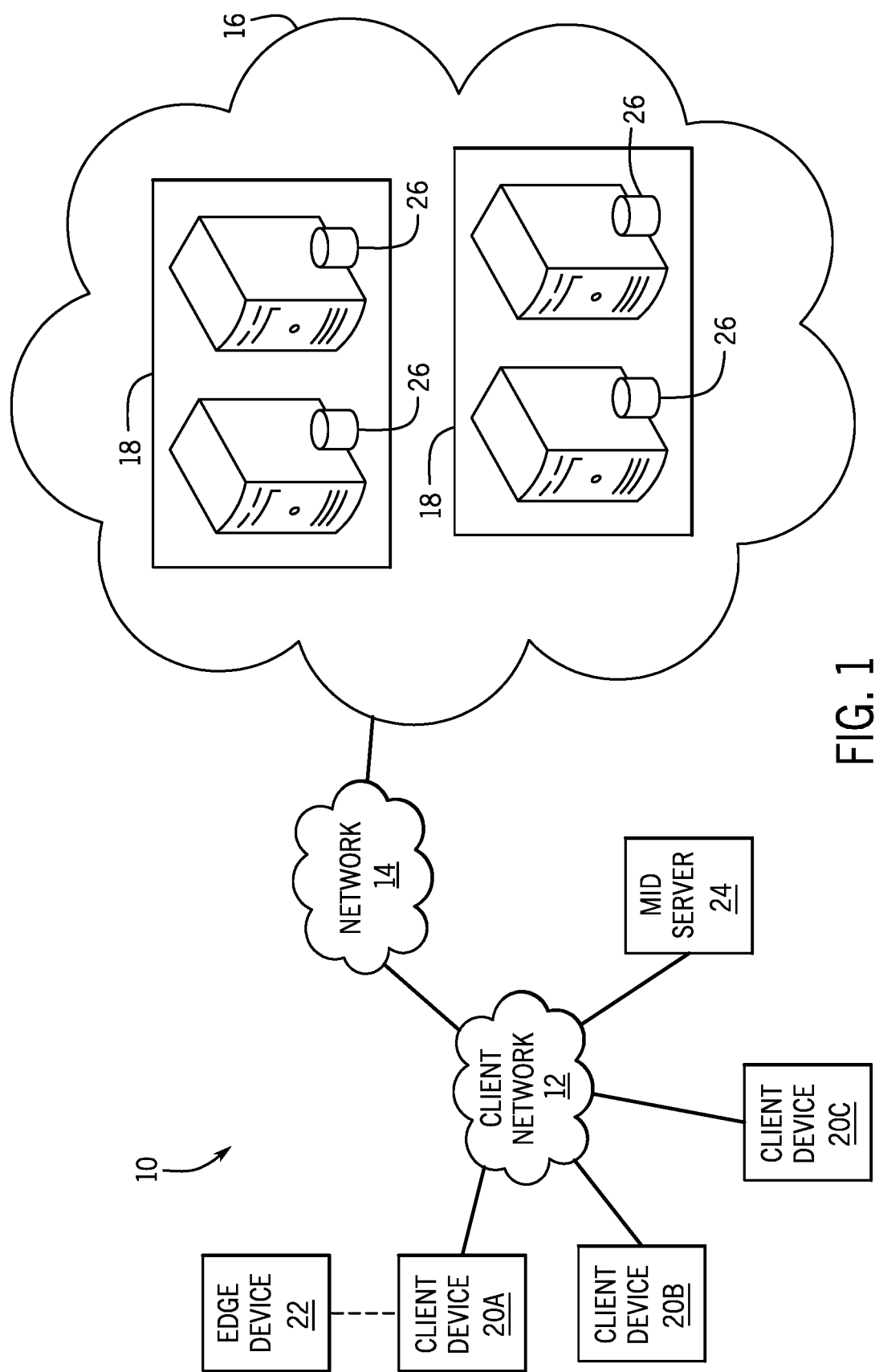
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, processor, memory, storage device, network device, power supply, piece of software, license, enterprise service, database table, script, webpage, piece of metadata, virtual resources, storage constructs, and so forth) in an enterprise network, for which relevant data, such as manufacturer, vendor, location, or similar data, is stored in a configuration management database (CMDB). As such, CIs may refer to a combination of physical resources or virtual resources. The CMDB may include an index of CIs, attributes (e.g., roles, characteristics of elements, etc.) associated with the CIs, and/or relationships between the CIs. Furthermore, the CMDB may track configuration files that relate to each CI.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking the configuration of these devices may become more difficult.

In such an interconnected but distributed context, the configuration of each of these devices may be represented by configuration items (CIs) that detail certain configurations, parameters, components, software, or settings associated with a respective device. CIs may include information related to a physical entity (e.g., hardware), a logical entity (e.g., a version or an instance of a database), a conceptual entity (e.g., a service or license), and the like, associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program or probe, running on the network in question. When a CI is identified by such routines, discovery includes exploring some or all of the CI's configuration, provisioning, and current status. This explored information may be used to update one or more databases, such as a configuration management database (CMDB), accordingly.

The CMDB stores and tracks all of the discovered devices connected to the network as well as any status information determined by the respective probe(s). Each of these devices may have one or more corresponding configuration files that control how the asset functions. These configuration files may facilitate discovery of corresponding devices. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB current. Thus, using the discovery process, an up-to-date map of devices and their infrastructural relationships may be maintained.

The disclosed techniques may enable a user to better maintain and manage a dynamic network of components. Specifically, the disclosed techniques enable a user to perform checks (e.g., discovery, metrics, or event management) on various configuration items (CIs) (e.g., devices, applications, containers, microservices, or ephemeral entities) on devices employed within a distributed system that may often be subject to change. For example, CIs may frequently be added, updated, or removed from the distributed system infrastructure. The disclosed techniques provide a multipartite paradigm that facilitates communication between a monitoring agent installed on a device associated with one or more CIs, a management or administrative server (e.g., a management, instrumentation, and discovery (MID) server), and a configuration management service to efficiently monitor data associated with each CI in the distributed system. In some embodiments, the multipartite paradigm may include more than one monitoring agent. For example, a monitoring agent may be installed on each device in a network that has multiple devices, and each monitoring agent may communicate with a MID server and a configuration management service. As such, the multipartite paradigm may provide an efficient and scalable monitoring framework that facilitates discovery, event management, and metrics collection with a plurality of CIs in the distributed system. The data shared between the monitoring agent, the MID server, and the configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the configuration management service.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
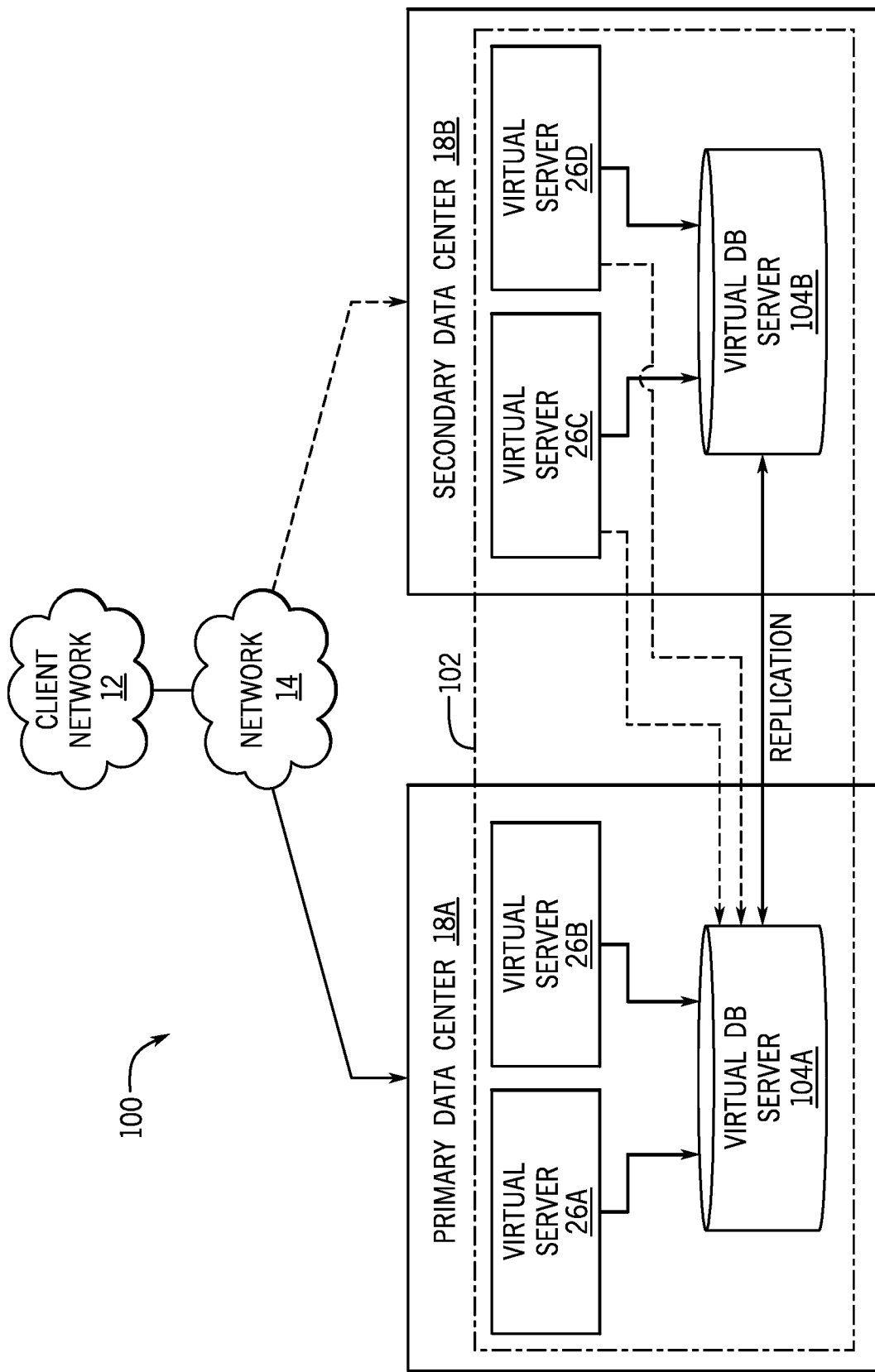
FIG. 2 is a schematic of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

As mentioned above, a monitoring agent may be installed on a device associated with one or more CIs, which, when executed on the device, may automatically perform a self-registration process (e.g., register an occurrence of the monitoring agent) with a management, instrumentation, and discovery (MID) server 24. Registration of the monitoring agent may generate a record of a particular monitoring agent in a data store of the MID server 24. For example, the data store may include a plurality of records of monitoring agents that have executed on a device in the system 100. Additionally, the MID server 24 may also update a CMDB with the record of the monitoring agent. As such, the MID server 24 and the CMDB may maintain an accurate, up-to-date data store of all monitoring agents that have been active in the system 100.

The monitoring agent may also perform one or more checks (e.g., discovery, metrics, or event management) on the device installed with the monitoring agent and send data collected from the check to the MID server 24. For example, the monitoring agent may send CI identification data (e.g., a CI identifier), attributes associated with a CI (e.g., an IP address, a serial number, or a time stamp associated with the check), any executing processes on the device, or the like, to the CMDB. The CMDB may then index the information received from the monitoring agent in CI records associated with corresponding CIs in the system. Additional details with regard to the monitoring agent is discussed below with regard to FIGS. 4-8.

The MID server 24 may act as an intermediary between a monitoring agent installed on a device and the CMDB (e.g., via a configuration management service or a client instance). In one embodiment, the MID server 24 may aggregate data received from one or more monitoring agents and send the aggregated data to the CMDB. For example, the MID server 24 may receive a discovery payload from each monitoring agent associated various devices associated with one or more CIs in the system 100. The MID server 24 may aggregate the discovery payload received from each monitoring agent and send the aggregated data to the CMDB. In another embodiment, the MID server 24 may send one or more check requests based on a monitoring policy received from the configuration management service (e.g., client instance) to the relevant monitoring agent associated with a CI. Additional details with regard to the MID server 24 will be discussed below with reference to FIGS. 4-8.

Figure 3:
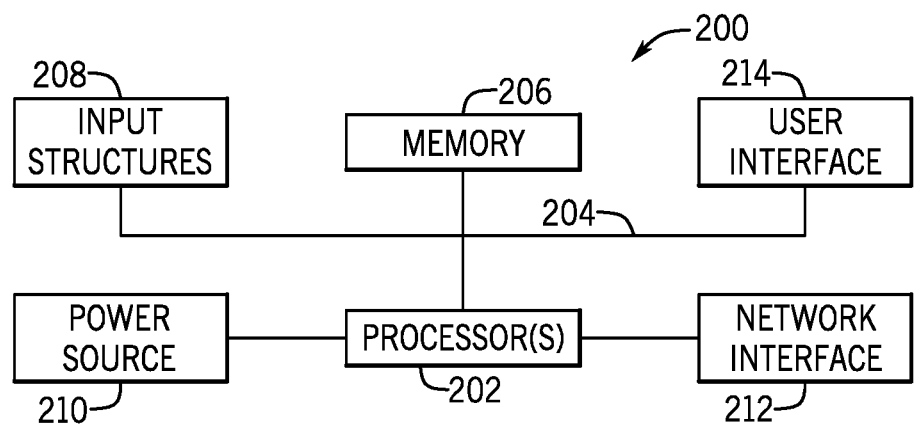
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
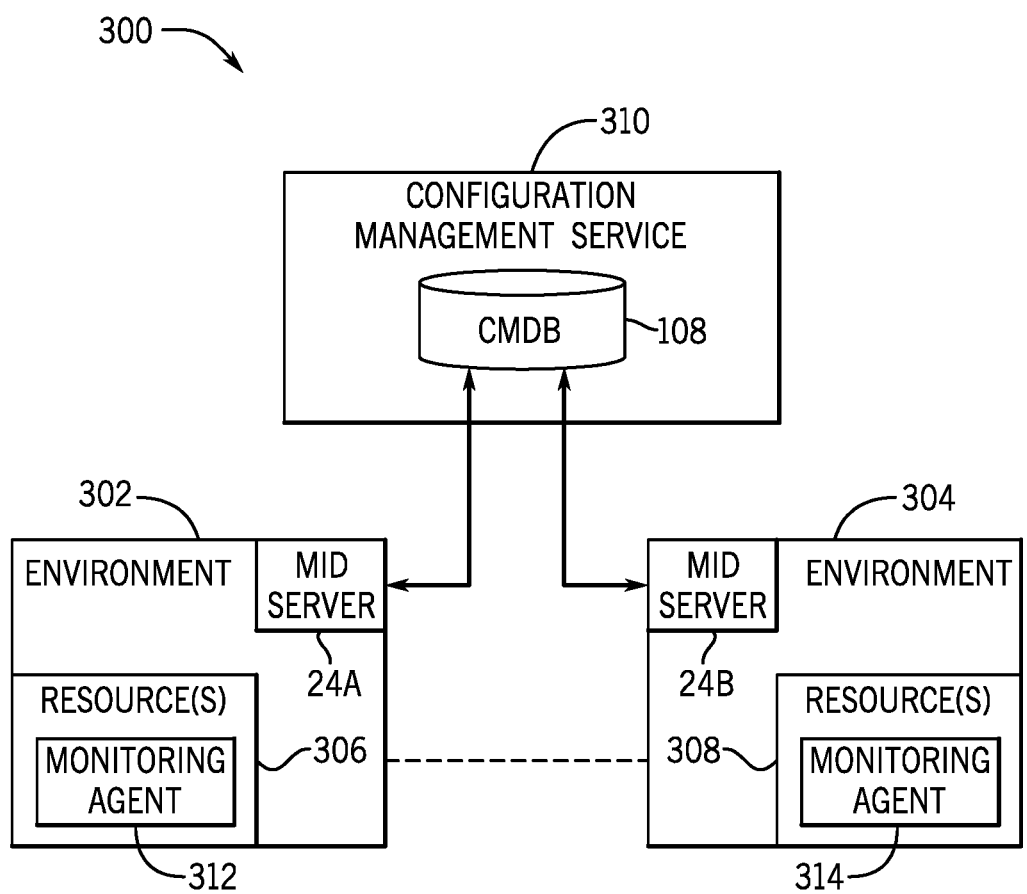
FIG. 4 is a block diagram of a distributed computing system that may be present in FIG. 1 or 2, in accordance with aspects of the present disclosure.

With this background discussion in mind, FIG. 4 is a block diagram of an embodiment of a distributed computing system 300 for discovering and/or managing connected configuration items (CIs). The distributed computing system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, environment 302, 304 may be distributed across multiple geographical locations. Thus, the environment 302, 304 may include any devices that are accessible by a user account including resources 306, 308 that may be spatially distant from each other. In some embodiments, resources 306, 308 of the environments 302, 304 may communicate with each other across environments. However, in some embodiments aspects of the various environments may be provided by different vendors without communication there between. In such embodiments, the resources of disparate environments may communicate using the platform 16 (e.g., a configuration management service 310 that is a part of a cloud service platform 16 including the CMDB 108). The resources 306 and 308 may include any suitable configuration item (CI) previously discussed.

As discussed above, a monitoring agent 312, 314 may be installed on each resource 306, 308 (e.g., device) in the environment 302, 304. After the monitoring agent 312, 314 is installed on a resource 306, 308, the monitoring agent 312, 314 may perform one or more tasks. For example, the monitoring agent 312, 314 may automatically register an occurrence of the monitoring agent 312, 314 with a MID server 24A, 24B. The MID server 24A, 24B may store the registered occurrence of the monitoring agent 312, 314 in a memory (e.g., data store) accessible to the MID server 24A, 24B. Thereafter, a communications protocol, such as a WebSocket protocol, may be associated with the monitoring agent 312, 314, the MID server 24A, 24B, and a configuration management service 310. In some embodiments, more than one communications protocol may be associated with the MID server 24A, 24B and the configuration management service 310. For example, a plurality of monitoring agents 312, 314 may automatically register respective occurrences of the monitoring agents 312, 314 with the MID server 24A, 24B. In such embodiments, the MID server 24A, 24B may communicate with each monitoring agent 312, 314 through a separate communications protocol (e.g., a WebSockets protocol).

The configuration management service 310 may include one or more servers providing access to and managing the CMDB 108. The configuration and management service 310 may allocate or provision resources, such as application instances in the resources 306, 308 from a respective environment 302, 304. Further, the configuration management service 310 may create, modify, or remove information in the CMDB 108 relating to the resources 306, 308. For example, the configuration management service 310 may store data associated with a CI from a monitoring agent 312, 314 via a corresponding MID server 24A, 24B in one or more CI records. Thus, the configuration management service 310 may manage a catalogue of resources in more than a single environment (even if the environments do not directly communicate with each other). Using this catalogue, the configuration management service 310 may discover new resources, provision resources, allocate resources, modify, and/or remove resources form the catalogue across a single environment or multiple environments. In some embodiments, these actions may be initiated as part of an operation executed on a client 102, may be scheduled for periodic occasions (e.g., periodic discovery), or may be a combination thereof. For example, a client 102 may receive a request, via its input structures, to query an identity of an application program interface (API) used by a resource to access a particular vendor or provider for the environment 302 that is passed to the configuration management service 310 to query the CMDB 108. As another example, the client 102 may receive a request, via its input structures, to query an identity of a user authorized to access a particular resource that is passed to the configuration management service 310.

The CMDB 108 may be populated utilizing a discovery process performed by the monitoring agent 312, 314. The discovery process may include determining one or more properties or attributes of various CIs associated with a resource 306, 308 using the monitoring agent 312, 314. The monitoring agent 312, 314 may send a discovery payload (e.g., one or more properties or attributes of various CIs) to the MID server 24A, 24B, which may then send the discovery payload to the CMDB 108. The CMDB 108 may then store the data associated with the discovery payload in corresponding CI records.

In the illustrated embodiment, each environment 302, 304 has its own respective MID sever 24A, 24B. In some embodiments, a single MID server may be employed when the MID server may reach into multiple environments. For example, if the MID server is run in the platform 16 (e.g., in the configuration management service 310), a single MID server may be used to manage both environments 302, 304. Additionally or alternatively, if the MID server 24A has access to the environment 304, the MID server 24B may be omitted.

Each discovered resource is identified as a configuration item with a record stored in the CMDB 108 including data indicating properties, attributes, dependencies, or other information about the resource. The CMDB 108 may be encoded, for example, as a relational database management system (RDBMS); an object-oriented database (e.g., an XML database); a network model database; or a flat-file database.

Figure 5:
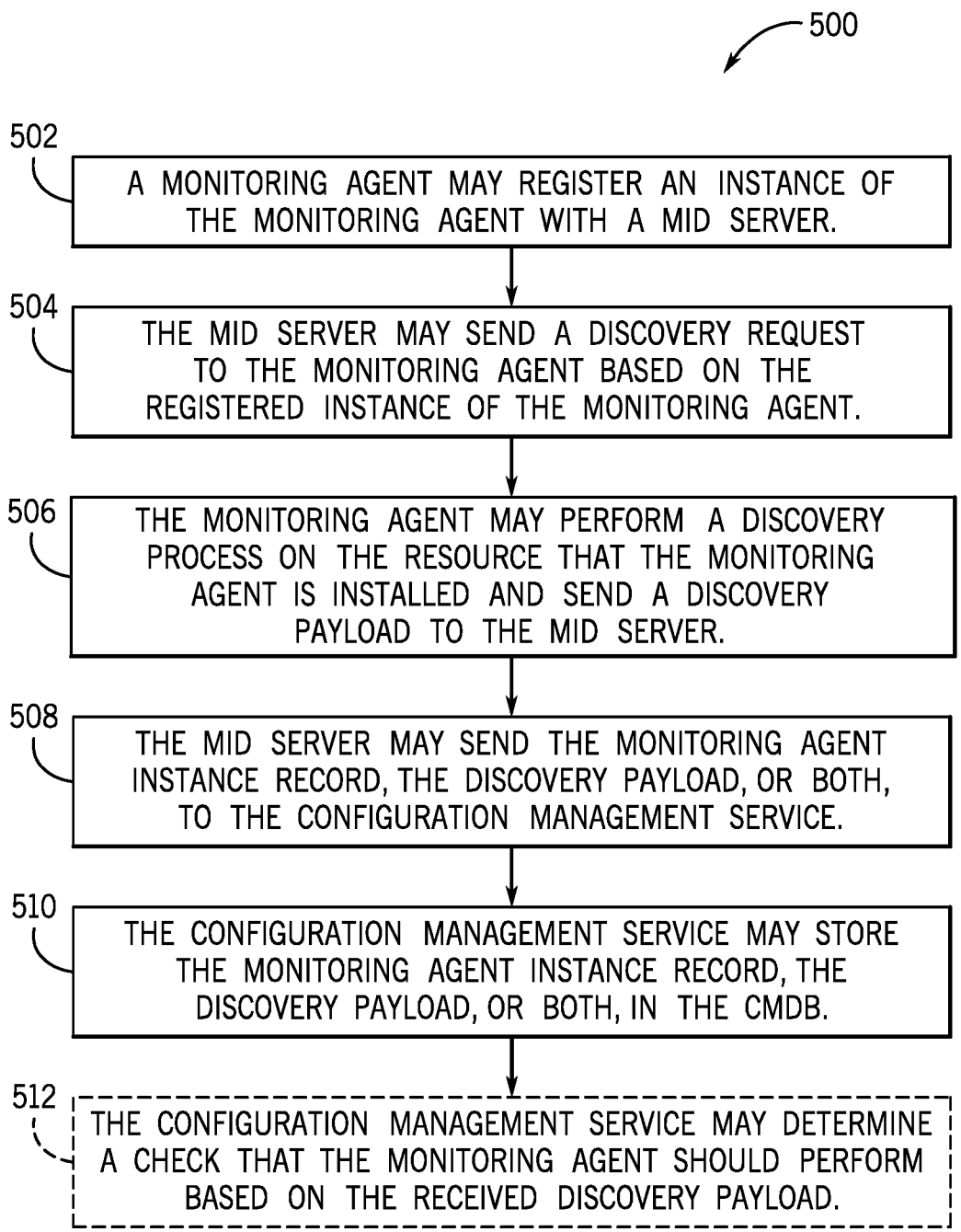
FIG. 5 is a flow diagram of a process for registration of a monitoring agent and subsequent discovery associated with the monitoring agent in the distributed computing system of FIG. 4, in accordance with aspects of the present disclosure.

In a distributed network with multiple CIs, it may be difficult and/or time-consuming to continuously probe the network to discover the CIs or update the records of each CI in the CMDB 108. Accordingly, after a monitoring agent 312, 314 has begun executing on a respective CI in the environment 302, 304, the monitoring agent 312, 314 may automatically register an occurrence of the monitoring agent 312, 314 with the MID server 24A, 24B. The MID server 24A, 24B may then register the occurrence of the monitoring agent 312, 314 with the CMDB 108 (e.g., via the configuration management service 310). In this way, the MID server 24A, 24B and the CMDB 108 may maintain an accurate, up-to-date data store of active monitoring agents 312, 314 installed on resources 306, 308 in the environment 302, 304. Additionally, the MID server 24A, 24B may send a discovery request to each monitoring agent 312, 314 to obtain data associated with CIs in the environment 302, 304 and send the information to the CMDB 108, thereby maintaining an accurate, up-to-date data store of CIs in the environment 302, 304. With the foregoing in mind, FIG. 5 is a flow chart of a method 500 for registering the monitoring agent 312, 314 with the MID server 24A, 24B, and the configuration management service 310 and discovering one or more CIs associated with the monitoring agent 312, 314 in the environment 302, 304. Although the following description of the method 500 is described in a particular order, it should be noted that the method 500 is not limited to the depicted order, and instead, the method 500 may be performed in any suitable order.

At block 502, the monitoring agent 312, 314 may register an occurrence of the monitoring agent 312, 314 with the MID server 24A, 24B. For example, after the monitoring agent 312, 314 has been installed on a resource 306, 308 (e.g., a device that may be associated with one or more CIs) in the environment 302, 304, the monitoring agent 312, 314 may send an occurrence identifier associated with the monitoring agent 312, 314 to the MID server 24A, 24B. In some embodiments, the occurrence identifier of the monitoring agent 312, 314 may also designate the resource 306, 308 that the monitoring agent 312, 314 is installed on. The MID server 24A, 24B may then generate and store a record associated with the occurrence of the monitoring agent 312, 314 in the memory of the MID server 24 that includes the occurrence identifier 312, 314.

At block 504, the MID server 24A, 24B may send a discovery request to the monitoring agent 312, 314 based on the registered occurrence of the monitoring agent 312, 314 with the MID server 24A, 24B. For example, the MID server 24A, 24B may determine whether the monitoring agent 312, 314 has performed a discovery process associated with the resource 306, 308 based on the record associated with the occurrence of the monitoring agent 312, 314 in the memory of the MID server 24A, 24B. In one embodiment, the MID server 24A, 24B may determine that the registration of the occurrence of the monitoring agent 312, 314 with the MID server 24A, 24B is a newly registered occurrence. The MID server 24A, 24B may access the record associated with the occurrence of the monitoring agent 312, 314 to determine if the record includes an attribute (e.g., a timestamp) associated with a discovery process performed by the occurrence of the monitoring agent 312, 314. If the MID server 24A, 24B determines that the record does not include an attribute associated with a discovery process performed by the occurrence of the monitoring agent 312, 314, the MID server 24A, 24B may send a discovery request to the monitoring agent 312, 314 to discover one or more attributes associated with the CI. In another embodiment, the configuration management service 310 may send the discovery request to the monitoring agent 312, 314 based on the record associated with the occurrence of the monitoring agent 312, 314 stored in the CMDB 108.

In some embodiments, if the MID server 24A, 24B determines that the record does include an attribute associated with a discovery process performed by the occurrence of the monitoring agent 312, 314, the MID server 24A, 24B may then determine whether the most recent discovery process performed by the occurrence of the monitoring agent 312, 314 is less than a threshold amount. For example, the MID server 24A, 24B may determine the time that the discovery process performed by the occurrence of the monitoring agent 312, 314 based on a timestamp associated with the discovery process. If the timestamp is greater than a threshold amount of seconds, minutes, or the like, from the current time, the MID server 24A, 24B may send a discovery request to the monitoring agent 312, 314. If the timestamp is less than a threshold amount of seconds, minutes, or the like, from the current time, the MID server 24A, 24B may proceed to block 508.

At block 506, the monitoring agent 312, 314 may perform a discovery process to discover one or more CIs associated with the resource 306, 308 that the monitoring agent 312, 314 is installed on in response to receiving a corresponding discovery request from the MID server 24A, 24B. For example, the monitoring agent 312, 314 may determine the name of each CI (e.g., a CI identifier), attributes associated with each CI (e.g., an IP address, a serial number, or a timestamp associated with the discovery process), any executing processes associated with each CI, or the like. The monitoring agent 312, 314 may then send a discovery payload (e.g., a CI identifier, an IP address, a serial number, and/or executing processes) associated with each CI to the MID server 24A, 24B. In some embodiments, the MID server 24A, 24B may store the discovery payload received from the monitoring agent 312, 314 in the record associated with the registered occurrence of the monitoring agent 312, 314.

At block 508, after receiving the discovery payload from the monitoring agent 312, 314, the MID server 24A, 24B may send the record associated with the registered occurrence of the monitoring agent 312, 314, the discovery payload, or both, to the configuration management service 310. At block 510, the configuration management service 310 may store the record associated with the registered occurrence of the monitoring agent 312, 314, the discovery payload, or both, in the CMDB 108. For example, the configuration management service 310 may store the discovery payload associated with each CI in a respective CI record. The configuration management service 310 may also associate each CI record with a respective record of a registered occurrence of a monitoring agent. At block 512, the configuration management service 310 may optionally determine one or more checks (e.g., a discovery process, metrics collection, or event management) that the monitoring agent 312, 314 may perform based on the received discovery payload. For example, the configuration management service 310 may determine the type of check that the monitoring agent 312, 314 should perform based on the type of CI (e.g., a container, a virtual machine, or a physical device) associated with the monitoring agent 312, 314. The configuration management service 310 may then send one or more check requests that correspond to the determined checks to the monitoring agent 312, 314. For example, the configuration management server 310 may send the check request with a monitoring agent identifier to the MID server 24A, 24B associated with the monitoring agent 312, 314. The MID server 24A, 24B may then send the received check request to the monitoring agent 312, 314 based on the monitoring agent identifier associated with the received check request. For example, the MID server 24A, 24B may compare the monitoring agent identifier with one or more records associated with registered occurrences of the monitoring agents 312, 314 in the memory of the MID server 24A, 24B, and send the received check request to the corresponding occurrence of a monitoring agent 312 upon determining a match. The monitoring agent 312, 314 may then perform one or more checks associated with one or more CIs based on the received check requests. For example, the monitoring agent 312, 314 may perform an additional discovery process, collect metrics, perform event management, or the like, based on the received check request.

In some embodiments, the monitoring agent 312, 314 may iteratively perform a discovery process associated with each CI after a predetermined or configurable period of time (e.g., thirty seconds, one minute, two minutes, or five minutes). For example, the configuration management service 310 may compare an attribute (e.g., timestamp) of each CI record stored in the CMDB 108 and send a discovery request to an appropriate MID server 24A, 24B based on the attribute being outside a predetermined range or threshold. For example, the configuration management service 310 may determine that the timestamp of a first CI record is greater than a threshold value (e.g., thirty seconds, one minute, or two minutes since the last discovery process) and send a discovery request to the monitoring agent 312, 314 via the appropriate MID server 24A, 24B. In some embodiments, the monitoring agent 312, 314 may track the performance rate of discovery and execute a discovery process when an attribute (e.g., a timestamp) exceeds a predetermined threshold (e.g., time).

Figure 6:
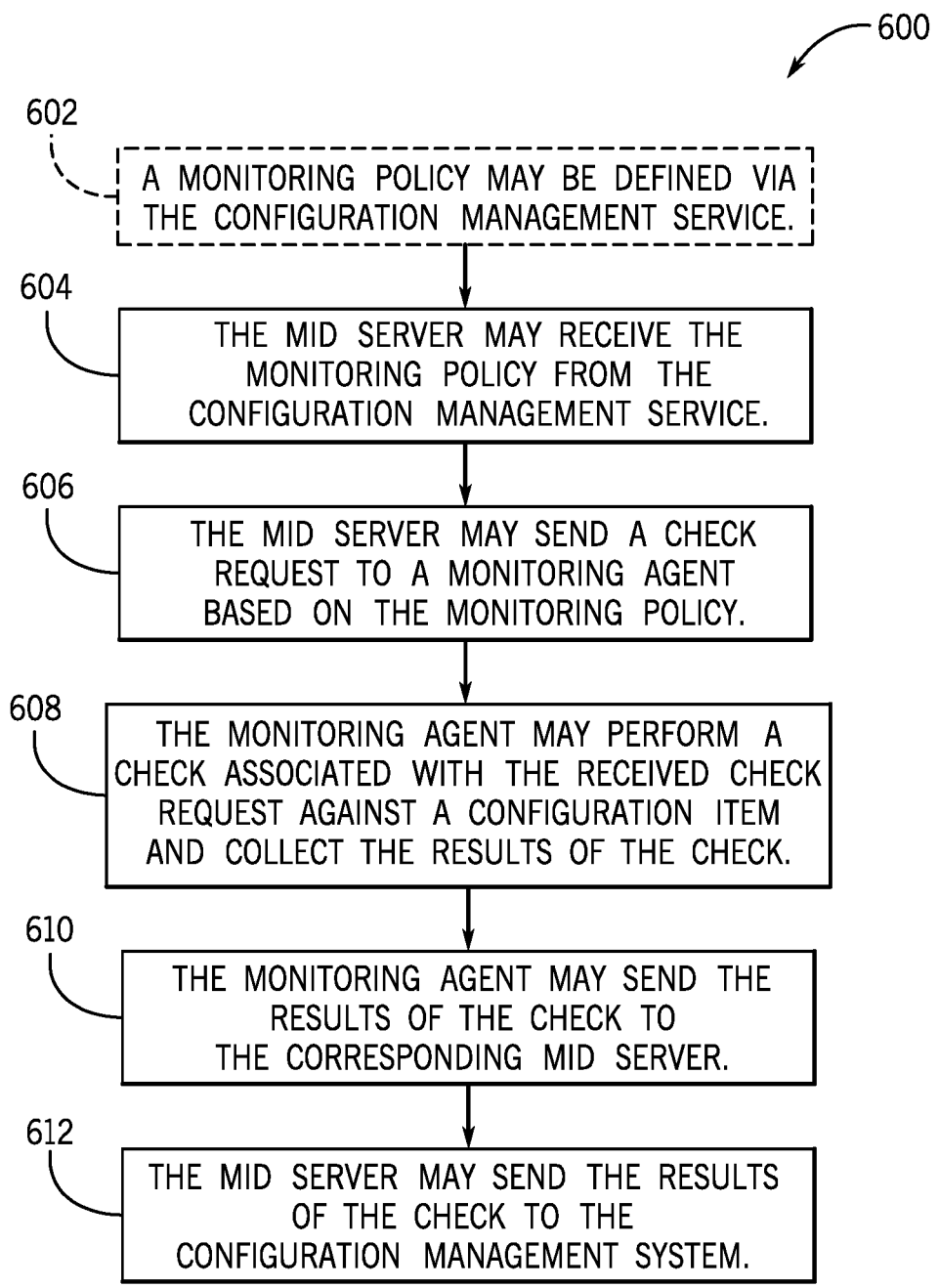
FIG. 6 is a flow diagram of a process for providing a check request to a monitoring agent in the distributed computing system of FIG. 4 based on a monitoring policy, in accordance with aspects of the present disclosure.

In some embodiments, it may be desirable for a user to configure one or more monitoring policies utilizing the configuration management service 310. For example, the user may wish to designate one or more checks that one or more monitoring agents 312, 314 in the environment 302, 304 may automatically perform in response to one or more conditions or events (e.g., after a certain amount of time passes, occurring in the environment 302, 304 of the system 300. After the monitoring agents 312, 314 perform the checks associated with respective CIs and/or resources 306, 308, the monitoring agents 312, 314 may then send the results of each check to the configuration management service 310 (e.g., via a respective MID server 24A, 24B). In this way, a user may receive up-to-date information regarding each CI in the environment 302, 305 of the network. With the foregoing in mind, FIG. 6 is a flow chart of a method 600 for sending one or more check requests to a registered occurrence of a monitoring agent 312, 314 based on a user-configurable monitoring policy. Although the following description of the method 600 is described in a particular order, it should be noted that the method 600 is not limited to the depicted order, and instead, the method 600 may be performed in any suitable order.

Referring now to FIG. 6, at block 602, a monitoring policy may optionally be defined by the user via the configuration management service 310. For example, a monitoring policy may include a population field that defines the one or more types of CIs that a monitoring agent may perform one or more checks against (e.g., all CIs that run Apache or all Linux servers), a check field that defines one or more types of checks (e.g., event management, metric collection, discovery, or the like) to be performed by the monitoring agent, and one or more parameters (e.g., a check frequency, a threshold value, or the like) associated with the check defined by the check field. In some embodiments, a user may select one or more monitoring policies to implement via the configuration management server 310 from a database of predefined monitoring policies.

At block 604, the MID server 24A, 24B may receive the monitoring policy from the configuration management service 310 and synchronize any check requests based on the received monitoring policy. The MID server 24A, 24B may determine one or more registered occurrences of monitoring agents 312, 314 associated with the types of CIs designated by the population field of a monitoring policy. For example, the MID server 24A, 24B may compare each type of CI designated in the population field of the monitoring policy with each record associated with registered occurrences of the monitoring agents 312, 314 in the environment 302, 304. The MID server 24A, 24B may then determine one or more occurrences of monitoring agents 312, 314 to send a corresponding check request based on the comparison.

In some embodiments, the configuration management service 310 may send the monitoring policy to more than one MID server 24A, 24B. For example, the configuration management service 310 may compare the types of CIs designated in the population field of the monitoring policy to one or more records associated with registered occurrences of monitoring agents 312, 314 in the environment 302, 304 of the system 300. The configuration management service 310 may determine that a first MID server 24A, a second MID server 24B, or both, may be associated with one or more monitoring agents 312, 314 that are associated with a CI that matches the type of CI designated by the monitoring policy. The configuration management service 310 may then send the monitoring policy to the corresponding MID servers 24A, 24B in the environment 302, 304.

At block 606, the MID server 24A, 24B may then send a check request to each monitoring agent 312, 314 that corresponds to the monitoring policy received from the configuration management service 310. For example, the MID server 24A, 24B may send a check request to a registered occurrence of each corresponding monitoring agent 312, 314 based on the CIs associated based on the CIs associated with each monitoring agent and the population field of the monitoring policy. At block 608, after receiving a check request from the MID server 24A, 24B, the monitoring agent 312, 314 may perform a corresponding check associated with the designated CI and collect the results of the check. For example, the results of a check may include one or more attributes associated with the check (e.g., the type of command, the interval or the frequency of the command, or the name of the command), and the output of the check (e.g., a human-readable message, measurements gathered by the check, or a state code (e.g., "0" or "OK", "1" or "Warning", "2" or "Critical")). In some embodiments, the check result may include a JavaScript Object Notation (JSON) document or other text file document.

At block 610, the monitoring agent 312, 314 may then send the results of the check to corresponding MID server 24A, 24B. At block 612, after receiving the results from the monitoring agent 312, 314, the MID server 24A, 24B may send the check results to the configuration management service 310. In some embodiments, the MID server 24A, 24B may receive results of a check from more than one monitoring agent 312, 314 in the environment 302, 304. In such embodiments, the MID server 24A, 24B may aggregate the check results from each monitoring agent 312, 314 and send the aggregated results to the configuration management service 310. For example, the MID server 24A, 24B may access each record of registered occurrences of the monitoring agents 312, 314 based on monitoring agent identifiers received with the check results. The MID server 24A, 24B may then associate the check results received from each monitoring agent 312, 314 with a CI identifier based on a comparison of one or more attributes stored in the record of the registered occurrence of the monitoring agent 312, 314 and the check results.

At block 612, the MID server 24A, 24B may send the results of each check received from monitoring agents 312, 314 to the configuration management system 310. For example, the MID server 24A, 24B may send each check result with a monitoring agent identifier, a CI identifier, or both to the configuration management service 310. The configuration management service 310 may then store the results of each check received in the CMDB 108. For example, the configuration management service 310 may associate the results of each check with corresponding records of CIs in the CMDB 108 based on a monitoring agent identifier, a CI identifier, or both, associated with each check result received. In this way, a user may automatically update the CMDB 108 with information associated with each CI in the environment 302, 304.

Figure 7:
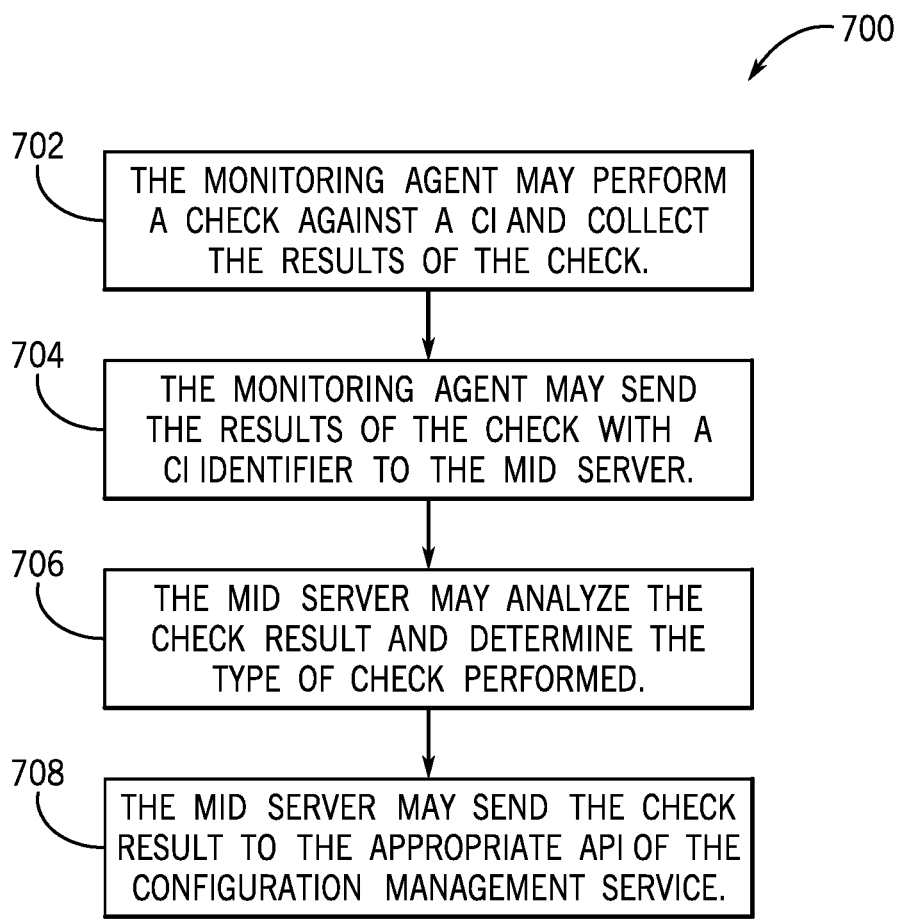
FIG. 7 is a flow diagram of a process for automatically binding a configuration item to results of a check performed by a monitoring agent in the distributed computing system of FIG. 4, in accordance with aspects of the present disclosure.

In some embodiments, after the monitoring agent 312, 314 has been registered with the MID server 24A, 24B and/or the configuration management service, it may be desirable to automatically bind the identity of a CI to the check results collected by a monitoring agent 312, 314, thereby alleviating any need for a user to manually determine the identity of the CI associated with each check result received by the configuration management service 310 from the monitoring agent 312, 314. For example, the monitoring agent 312, 314 may automatically perform a check (e.g., a discovery process, metrics collection, or event management) against a CI according to a configurable monitoring policy or in response to the occurrence of some event (e.g., a communications network going offline). The monitoring agent 312, 314 may then collect the results of the check and send the results to a corresponding MID server 24A, 24B and/or the configuration management service 310. Since the occurrence of the monitoring agent 312, 314 is already registered with the MID server 24A, 24B and/or the configuration management service 310, the MID server 24A, 24B and/or the configuration management service 310 may automatically determine the identity of the CI that is associated with a check result received from the monitoring agent 312, 314. For example, the record associated with the registered occurrence of the monitoring agent 312, 314 in the memory of the MID server 24A, 24B may include one or more CI identifiers corresponding to CIs monitored by the monitoring agent 312, 314. Based on the CI identifiers associated with the record of the registered occurrence of the monitoring agent 312, 314, the MID server 24A, 24B may automatically determine the identity of the CI associated with a check result by virtue of receiving the check result from a particular monitoring agent 312, 314 because the check result includes a CI identifier. With the foregoing in mind, FIG. 7 is a flowchart of a method 700 for automatically binding a CI to the results of a check performed by a monitoring agent 312, 314 against the CI. Although the following description of the method 700 is described in a particular order, it should be noted that the method 700 is not limited to the depicted order, and instead, the method 700 may be performed in any suitable order.

Referring now to FIG. 7, at block 702, the monitoring agent 312, 314 may perform a check against a CI and collect the results of the check. For example, the monitoring agent 312, 314 may perform a discovery process, collect metrics, or collect information associated with an event that has affected the CI. At block 704, the monitoring agent 312, 314 may then send the results of the check to a corresponding MID server 24A, 24B. At block 706, the MID server 24A, 24B may analyze the received check results to determine the type of check performed by the monitoring agent 312, 314 against the CI. For example, the received check results may include a check type identifier. At block 708, based on the check type identifier, the MID server 24A, 24B may send the check results to the appropriate API of the configuration management service 310 to continue processing of the check results.

In some embodiments, the monitoring agent 312, 314 may perform a check request from a MID server 24A, 24B based on a monitoring policy received from the configuration management service 310, as described above with regard to FIG. 6. In such embodiments, the monitoring agent 312, 314 may perform the check corresponding to the check request and send the results as described above with regard to FIG. 7. In this way, a closed loop may be maintained between the monitoring agents 312, 314, the MID servers 24A, 24B, and the configuration management service 310, thereby enhancing a communication efficiency between the components of the paradigm. The monitoring agents 312, 314 may receive user configurable check requests from the configuration management service 310 via the MID server 24A, 24B, and the configuration management service 310 may receive updated data associated with one or more CIs in the environment 302, 304 of the system 300.

Figure 8:
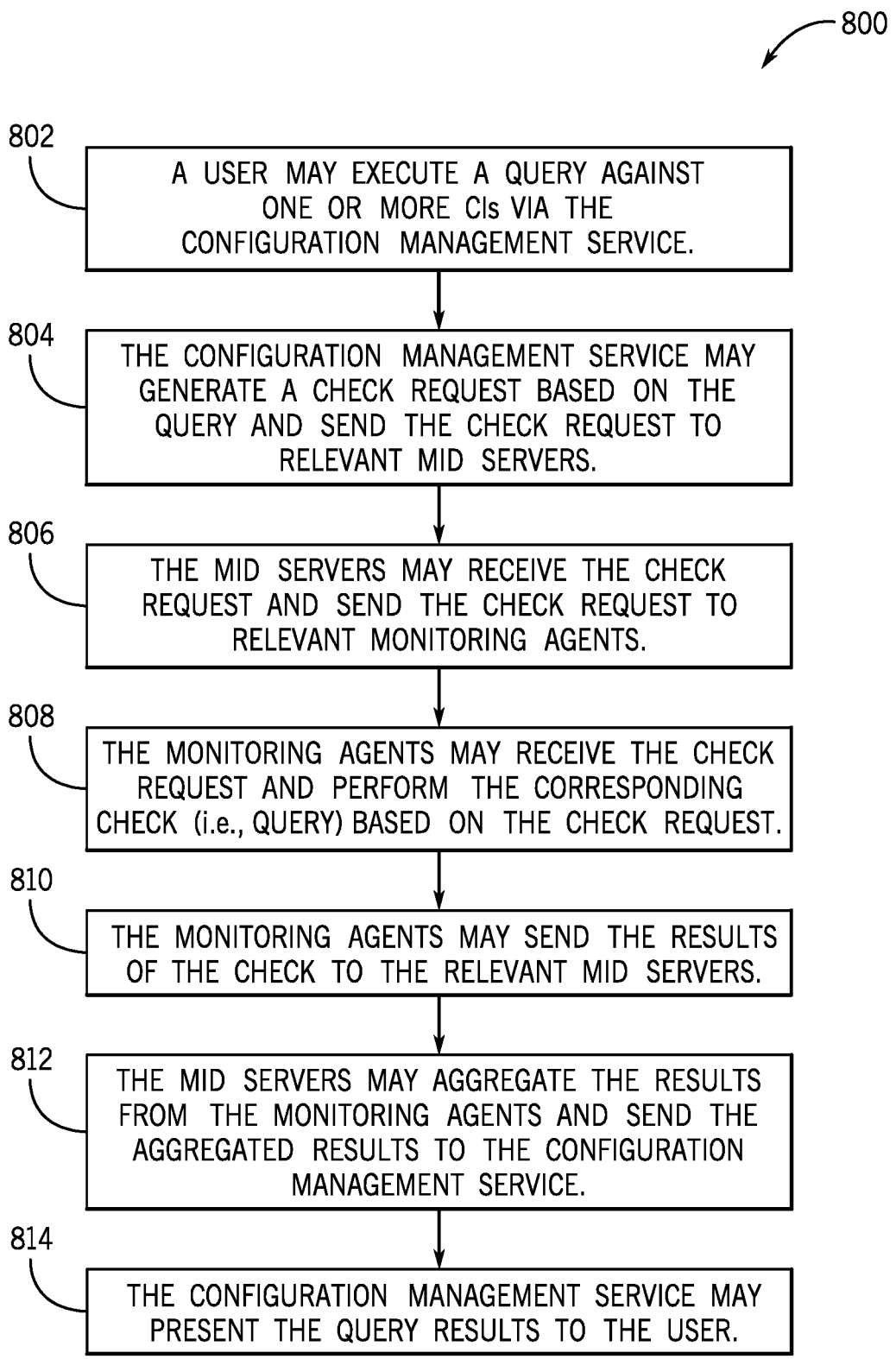
FIG. 8 is a flow diagram of a process for querying a configuration item in the distributed computing system of FIG. 4 via a monitoring agent, in accordance with aspects of the present disclosure.

Additionally, a user may wish to access up-to-date information about a CI in the distributed system 300 rather than waiting for the entire CMDB 108 to populate with information about each CI in the system 300. Accordingly, a user may receive real-time (or substantially real-time) queries of a CI in the distributed system 300 through the configuration management service 310. With the foregoing in mind, FIG. 8 is a flowchart of a method 800 for querying one or more CIs in the system 300 and presenting the results of the query to a user via the configuration management service 310. Although the following description of the method 800 is described in a particular order, it should be noted that the method 800 is not limited to the depicted order, and instead, the method 800 may be performed in any suitable order.

Referring now to FIG. 8, at block 802, a user may execute a query against one or more CIs in the distributed system 300 via the configuration management service 310. For example, the user may select a pre-defined query to run from one or more queries stored in a database accessible by the configuration management service 310. In another example, the user may configure a query by designating one or more CIs or one or more CI types to be queried. At block 804, the configuration management service 310 may generate a check request based on the query and send the check request to relevant MID servers 24A, 24B. In some embodiments, the configuration management service 310 may access one or more CI records in the CMDB 108 and/or one or more records of registered occurrences of monitoring agents 312, 314 to determine which MID servers 24A, 24B to send the check request. For example, the CI records or the records of registered occurrences of monitoring agents 312, 314 may include a MID server identifier that represents the MID server 24A, 24B present in the environment 302, 304 that communicates with a particular monitoring agent 312, 314. The configuration management service 310 may then send the check request to the MID servers 24A, 24B determined to be relevant to the CIs targeted by the query. In some embodiments, the configuration management service 310 may send the check request with a CI identifier to the MID servers 24A, 24B.

At block 806, the MID servers 24A, 24B may receive the check requests from the configuration management service 310 and send the check requests to relevant monitoring agents 312, 314. In some embodiments, the MID servers 24A, 24B may access the records of registered occurrences of monitoring agents 312, 314 in the environment 302, 304 for CI identifiers that match the CI identifier received with the check requests. If the MID server 24A, 24B determines that a match is present with regard to a particular record of a registered occurrence of a monitoring agent 312, 314, the MID server 24A, 24B may send the check request to the monitoring agent 312, 314 associated with the record. In some embodiments, the MID server 24A, 24B may send a check request to more than one monitoring agent 312, 314 based on matching CI identifiers.

At block 808, the monitoring agents 312, 314 may receive the check request and perform a corresponding check based on the check request. For example, the check request may correspond to a discovery process, metrics collection, or event management. The monitoring agent 312, 314 may perform the appropriate check on the CI based on the check request. In some embodiments, the monitoring agent 312, 314 may be associated with more than one CI. In such embodiments, the monitoring agent 312, 314 may determine the CI to perform the check against based on a CI identifier received with the check request. In any case, at block 810, after the monitoring agent 312, 314 performs the check against the CI, the monitoring agent 312, 314 may collect the results of the check and send the check results to a corresponding MID server 24A, 24B. In some embodiments, more than one monitoring agent 312, 314 may perform a check against a corresponding CI, and each monitoring agent 312, 314 may send the results of the check to a corresponding MID server 24A, 24B in the environment 302, 304.

At block 812, the MID servers 24A, 24B may aggregate the check results received from each monitoring agent 312, 314 and send the aggregated results to the configuration management service 310. For example, each MID server 24A, 24B that sent check requests to monitoring agents 312, 314 at block 806, may receive check results from each of the monitoring agents 312, 314. Each MID server 24A, 24B may then send the check results with monitoring agent identifiers, CI identifiers, or both, to the configuration management service 310.

At block 814, the configuration management service 310 may present the check results associated with the query to the user via a display device. For example, the configuration management service 310 may parse the check results received from the MID servers 24A, 24B and display information associated with each CI queried on the display device. In one embodiment, the configuration management service 310 may generate a report that includes the check results associated with the query. In another embodiment, the configuration management service 310 may update corresponding CI records with the received check results in the CMDB 108.

Further, in systems with multiple CIs, it may be difficult and/or time-consuming to determine suitable entry points for probing a distributed system 300 to discover or update the multiple CIs. Accordingly, embodiments discussed herein may facilitate the definition of one or more entry points for a particular CI of the distributed system 300. An entry point as used herein is a property of a connection (e.g., the URL, the IP address, or the port) to a CI. For example, to map an electronic mailing enterprise service, an email address may be defined as an entry point.

After an enterprise service is added to the distributed system 300 or created in the distributed system 300, a monitoring agent 312, 314 may automatically be associated with the enterprise service. An occurrence of the monitoring agent 312, 314 may then register itself with the MID server 24A, 24B (and the configuration management service 310 via the MID server 24A, 24B). In response to the registration of the occurrence of the monitoring agent 312, 314, the configuration management service 310 may automatically generate a check request to ping an entry point (e.g., URL or port) associated with the enterprise service to determine if the entry point is active. The configuration management service 310 may then send the check request to a relevant MID server 24A, 24B, and the MID server 24A, 24B may send the check request to a corresponding monitoring agent 312, 314. If the monitoring agent 312, 314 determines that the entry point associated with the service is active, the monitoring agent 312, 314 may send the results back to the configuration management service 310 (via the MID server 24A, 24B). For example, the check results may include a name of the entry point, a name of a CI associated with the entry point, additional entry points and/or CIs that may communicate with the entry point or the CI associated with the entry point, or any other suitable information. The configuration management service 310 may then generate one or more check requests associated with discovery and service mapping the distributed system 300 based on the active entry point.

The disclosed techniques enable a user to better maintain and manage a dynamic network of components. Specifically, the disclosed techniques enable a user to perform checks (e.g., discovery, metrics, or event management) on various configuration items (CIs) (e.g., devices, applications, containers, microservices, or ephemeral entities) on devices employed within a distributed system that may often be subject to change. The disclosed techniques provide a multipartite paradigm that may provide an efficient and scalable monitoring framework that facilitates discovery, event management, and metrics collection with a plurality of CIs in the distributed system. The data shared between a monitoring agent, a MID server, and a configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the configuration management service. Additionally, the registration of an occurrence of the monitoring agent with the MID server and/or the configuration management service may minimize the need to bind a CI to data produced as a result of a check performed by the monitoring agent on the CI.

The specific embodiments described above have been shown by way of example and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. A system, comprising:
a processor; and
a memory, accessible by the processor, the memory storing instructions, that when executed by the processor, cause the processor to perform operations comprising:
transmitting a discovery request to a monitoring agent executing on a computing resource within a managed network;
receiving a discovery payload from the monitoring agent, wherein the discovery payload comprises data associated with the computing resource and one or more additional computing resources associated with the computing resource in the managed network;
transmitting the discovery payload to a configuration management service, wherein the configuration management service is configured to store, in a configuration management database (CMDB), the discovery payload as one or more respective configuration items (CI) records corresponding to the computing resource and the one or more additional computing resources;
receiving, from the configuration management service, one or more check requests associated with the computing resource, or the one or more additional computing resources, or both;
transmitting the one or more check requests to the monitoring agent, wherein the monitoring agent is configured to perform the one or more check requests against the computing resource, or the one or more additional computing resources, or both; and receiving a check result from the monitoring agent, wherein the check result comprises data associated with the one or more check requests and the computing resource, or the one or more additional computing resources, or both.

2. The system of claim 1, wherein the one or more check requests comprise an additional discovery request, a metrics collection request, or an event management request, or a combination thereof.

3. The system of claim 1, wherein a respective type of each check request of the one or more check requests is determined by the configuration management service based on a respective type of each resource of the computing resource, or the additional computing resources, or both, in the discovery payload.

4. The system of claim 1, wherein the operations comprise transmitting the check result to the configuration management service, wherein the configuration management service is configured to store the check result in the CMDB.

5. The system of claim 1, wherein the operations comprise storing the check result in the memory and updating a record associated with the monitoring agent based on the check result.

6. The system of claim 1, wherein the operations comprise:
receiving an indication of the monitoring agent executing on the computing resource within the managed network; and
storing a record associating the monitoring agent with the computing resource in the memory in response to receiving the indication of the monitoring agent.

7. The system of claim 6, wherein transmitting the discovery request to the monitoring agent comprises determining that the record does not include an attribute associated with a previously performed discovery process.

8. The system of claim 6, wherein transmitting the discovery request to the monitoring agent based on the record comprises determining that at least a quantity of time has passed since a previously performed discovery process associated with the monitoring agent was performed.

9. The system of claim 1, wherein the operations comprise storing the discovery payload in the memory.

10. The system of claim 1, wherein the operations comprise identifying a record associated with the monitoring agent in the memory based on the one or more check requests, and determining that the monitoring agent is associated with the computing resource, the one or more additional computing resources, or both, before transmitting the one or more check requests to the monitoring agent.

11. A method, comprising:
receiving, via one or more processors from a configuration management service, one or more check requests associated with a monitoring agent, wherein the configuration management service is configured to transmit the one or more check requests after receiving a discovery payload associated with a managed network;
identifying, via the one or more processors, a record associated with a registered monitoring agent in a memory accessible by the one or more processors based on the one or more check requests, wherein the registered monitoring agent is installed on a computing resource within the managed network;
transmitting, via the one or more processors, the one or more check requests to the registered monitoring agent, wherein the registered monitoring agent is configured to perform the one or more check requests against the computing resource, or one or more additional computing resources associated with the computing resource, or both;
receiving, via the one or more processors, a check result from the registered monitoring agent, wherein the check result comprises data associated with the one or more check requests and the computing resource, or the one or more additional computing resources, or both; and
transmitting, via the one or more processors, the check result to the configuration management service, wherein the configuration management service is configured to store the check result in a configuration management database (CMDB).

12. The method of claim 11, wherein a respective type of each check request of the one or more check requests is determined by the configuration management service based on a respective type of each resource associated with the discovery payload.

13. The method of claim 11, wherein the memory accessible by the one or more processors comprises respective records of a plurality of monitoring agents installed on a plurality of computing resources within the managed network, wherein the respective records comprise the record associated with the registered monitoring agent.

14. The method of claim 11, wherein identifying the record based on the one or more check requests comprises determining that a monitoring agent identifier of the one or more check requests matches a corresponding monitoring agent identifier of the record.

15. The method of claim 11, comprising transmitting, via the one or more processors, the discovery payload to the configuration management service, wherein the configuration management service is configured to store, in the CMDB, the discovery payload as one or more configuration items (CI) records associated with respective computing resources in the managed network.

16. The method of claim 11, comprising transmitting, via the one or more processors, a discovery request to the registered monitoring agent for the discovery payload.

17. A non-transitory, computer-readable medium, comprising instructions that when executed by one or more processors, cause the one or more processors to perform operations comprising:
transmitting a discovery payload associated with one or more computing resources in a managed network to a configuration management service;
receiving one or more check requests from the configuration management service, wherein the configuration management service is configured to determine a respective type of each check request of the one or more check requests based on a respective type of each resource of the one or more computing resources associated with the discovery payload;
transmitting the one or more check requests to one or more respective monitoring agents in the managed network, wherein the one or more respective monitoring agents are configured to perform the one or more check requests against the one or more computing resources;
receiving one or more respective check results from the one or more respective monitoring agents, wherein the one or more respective check results comprise data associated with the one or more computing resources; and transmitting the one or more respective check results to corresponding application program interfaces (APIs) of the configuration management service.

18. The non-transitory, computer-readable medium of claim 17, wherein the one or more check requests comprise an additional discovery request, a metrics collection request, or an event management request, or a combination thereof.

19. The non-transitory, computer-readable medium of claim 17, wherein the configuration management service is configured to store the one or more respective check results in a configuration management database (CMDB).

20. The non-transitory, computer-readable medium of claim 17, wherein the operations comprise identifying one or more respective records associated with the one or more respective monitoring agents based on the one or more check requests, and determining that the one or more respective monitoring agents are associated with the one or more respective monitoring agents before transmitting the one or more check requests to the one or more respective monitoring agents.

* * * * *